Patented Feb. 25, 1936

2,031,974

UNITED STATES PATENT OFFICE 2,031,974

RECOVERY OF CHEMICALS FROM WASTE PULPING LIQUORS

Harold R. Murdock, Canton, N. C., assignor to The Champion Fibre Company, Canton, N. C., a corporation of Ohio No Drawing. Application November 4, 1933, Serial No. 696,740

5 Claims. (Cl. 23—48)

This invention relates to the art of recovering chemicals from the waste liquors obtained as by-products in the pulping of wood and the like by a chemical process, and is concerned with an improvement in the oxidation of the organic matter content, and/or of the "chemical" content, of such waste liquors.

In the manufacture of pulp from wood or other vegetable matter it is, for economic reasons, usually necessary to recover the chemicals used in the process. Pulping processes consist essentially in dissolving non-cellulosic materials from the cellular portion of the wood or equivalent by means of aqueous solutions of chemicals, and consequently the waste liquors from the pulping operations comprise soluble inorganic and organic substances. Efforts to separate these substances one from another by such methods as crystallization and precipitation have not been reduced to commercial practice and the recovery process has by necessity become one of evaporation followed by thermal decomposition of the organic material content of the evaporation solids. In some processes these steps are independently practiced, while in others the evaporation and incineration steps simultaneously are operated. In the operation of the process of the present invention, however, it is immaterial whether the steps occur independently or simultaneously. In the incineration of the organic matter content of waste pulping liquor the basic principle is to bring the material to a sufficiently high temperature in the presence of an oxidizing gas, usually air, to promote decomposition and oxidation of the organic matter content. None of the commercial methods as now practiced do anything else from a chemical point of view, although the mechanical equipment and method of contacting the oxidizing gases with the organic matter differ in the many processes used.

It is an object of the present invention to provide an improved recovery process by which to assist the oxidation of the organic matter content of the waste liquor by the addition of a chemical to the material, either before, during or following the incineration, which chemical is adapted to assist combustion of the organic matter and which may be, and preferably is, simultaneously convertible, either directly or indirectly, to an active pulping chemical.

It has been found that the addition of an oxidizing chemical, for example. a nitrite, peroxide, chromate, permanganate, or like salt, of an alkali metal or of an alkaline earth metal, is effective. However, for the particular purpose desired it is very advantageous to use only such salts which, upon decomposition, leave no material amount of undesirable impurities present in the product. Examples of such materials are the nitrates, peroxides, nitrites, etc., of sodium, all of which, under reaction with organic matter at relatively high temperatures, are converted into sodium carbonate which latter is, after causticization, a major ingredient of pulping liquors.

In the known sulphite process the improvement according to the present invention, while of relatively less importance from the standpoint of reclaiming the chemicals, can be of value, particularly when the base used is sodium. In such case the pulping chemical consists of sodium bisulphite in the presence of free sulphurous acid. Evaporation of such waste liquors leaves a residue of sodium sulphite and sodium bisulphite. When this residual product is incinerated with, for instance, sodium nitrate, a carbonaceous product, containing sodium sulphate and sodium carbonate, results. This recovered chemical is thus available as a raw material for the sulphate process.

In the soda process the pulping liquor is essentially a caustic soda solution obtained from the causticization of sodium carbonate. Therefore, waste liquor from this process contains sodium carbonate and organic matter, which latter, when mixed with an oxidation aid in accordance with the present invention, for instance sodium nitrate, and incinerated, yields a product consisting only of sodium carbonate and carbon. The leached solution from this product, upon causticization, reproduces a sodium hydroxide solution adapted for use in pulping, with no impurities introduced into the system from the oxidizing chemicals.

In the sulphate or kraft process of pulping, sodium sulphide and sodium hydroxide are employed as the active pulping chemicals. In such case, the use of the oxidation aid of the present invention to assist the incineration step adds only sodium carbonate, a non-deleterious constituent, to the recovered inorganic chemicals, and consequently not only does not detract from, but materially improves, the process.

As an example of the workability of this process, the following experiment may be cited: In the recovery of chemicals from the soda process in a certain pulp mill, the waste liquor (50% solids) was fed to a rotary incinerator where it became evaporated and incinerated and fell from the discharge end of the rotary incinerator onto a drag chain conveyor by which it was carried to the leaching cells for separating the sodium carbonate from the carbon of the incineration product. At the discharge end of the rotary incinerator a blast of hot air, from an outside source, was introduced, and the hot air blast passed through the rotary incinerator countercurrent to the passage of the waste liquor, thence through a combustion chamber and a waste heat boiler and into a stack. In this particular plant, four such units were operating in parallel upon liquor, coming from the soda mill. Into one of the units was fed waste liquor containing 50 pounds of added $NaNO_3$ to 100 gallons of 50% solids waste liquor, while into the other units was fed similar waste liquor coming from a common tank, but which did not contain added sodium nitrate. The volume and temperature of the entering hot gases and other operating conditions were kept as identical as possible in all units. Observation through peep holes in the combustion chamber showed very decided differences in the combustion. The $NaNO_3$-treated waste liquor burned with a bright red glow in definite contrast to the dull dark fire of the other units. The discharged ash from the $NaNO_3$-treated material also was much better burned than was that from the other units and its organic content was much more nearly completely consumed and the ash free of large lumps such as are found when $NaNO_3$ is not used. These lumps are due to the thick liquor balling in the rotary incinerator. It is possible that such condition starts to occur also in the $NaNO_3$-treated liquor but that at the higher temperatures the chemical within the lump reacts with the organic content thereof and the resulting gases disintegrate the lump, thereby expediting its complete combustion. Whatever may be the explanation, it is a fact that the ash of the $NaNO_3$-treated material is in a more desirable form and state because it contains no incompletely burned "black ash" which would retard the subsequent leaching of the sodium carbonate from the carbon mass.

From the ash of the aforesaid $NaNO_3$-treated waste liquor there was leached sodium carbonate in an amount at least equal to that amount of sodium (calculated as sodium carbonate) present in the original cooking liquor from which the said waste liquor was derived; thus, after suitable causticization of the leach liquor there was prepared a digestion liquor of full strength and quantity for perpetuation of the pulping process, to which leach liquor and/or digestion liquor the addition of no further chemical (i. e., sodium carbonate or caustic soda) was required.

By means of subsequent experiments I have found that the relative quantity of oxidation aid, (e. g., sodium nitrate, sodium permanganate, or equivalent salt of an alkali metal or of an alkaline earth metal) to be added to the liquor cycle may for practical purposes be determined by the relative proportion of digestion chemical "lost" from that cycle. That is to say, for example, I have found that when as much sodium (in the form of sodium nitrate) is added to the black liquor as is determined to have been removed, during the digestion, separation of pulp, etc., from the digestion liquor from whence the black liquor was derived the incineration of the black liquor is more advantageously accomplished, the resulting black ash is improved in quality, and no further addition of make-up chemical is required. However, the amount of so-added sodium, in the form of an oxidizing salt thereof, may be varied, e. g., somewhat diminished, without departing from the concept of the present invention, it being observed that where less sodium nitrate is added than is called for by reason of the reduced inorganic chemical content of the black liquor (as contrasted with the original digestion liquor) the difference must be made up by addition of sodium in the form of a suitable salt or compound thereof (e. g., as sodium carbonate, or caustic soda, depending upon the stage at which the added sodium compound is introduced into the cycle). I have found that any substantial addition of oxidation-expediting salt of sodium is attended with a corresponding improvement in the incineration of the so-treated black liquor and in the form and quality of the resulting black ash.

In the practice of this invention it is not essential that the chemical be added to the concentrated waste liquor: it may with equally satisfactory results be added to the weak waste liquor coming from the digesters, or to the liquor when only partially evaporated. Then, again, for some purposes, it might be found useful to add the chemical to the rotary incinerator or other incinerating apparatus separate from the liquor feed. Also in some cases it might be found advantageous to add the chemical to the hot black ash as it falls from the incinerator and then permit it to react on the incomplete ash during its passage to the leach cells, or even in a separate chamber, smelter, etc., for this specific purpose. Or, one may admix the oxidizing chemical with powdered or dried black liquor and thereafter incinerate the mixture: the time of the addition appears not to be critical.

This conception is equally applicable to, and as advantageous in, the sulphate process. When applied to the latter exactly the same chemical is recovered, and the technique of the process is substantially the same. It would not be practicable to add the $NaNO_3$ (or equivalent chemical) to the smelter charge but it may be added at any stage prior to introduction of the black ash into the smelter.

While the invention has been described above with reference to the addition of an alkali metal salt, or alkaline earth metal salt, of an inorganic acid, it should be pointed out that there may be employed any metallic salt of the aforesaid acids whose metallic radical is capable of reacting with sodium carbonate, or with sodium hydroxide, to form a carbonate or hydroxide which is insoluble in alkali.

The inventive concept of the present invention is not limited to or by the foregoing specific embodiments, the invention broadly covering, as it does, the concept of adding to a pulping liquor such an inorganic salt as is capable of assisting in the combustion of organic matter derived from the pulping process, and more specifically, the concept of adding to a pulping liquor, as a preliminary to eventual incineration of the solids content of the liquor, such an inorganic salt of an alkali metal or alkaline earth metal as is capable of assisting in the combustion of organic matter derived from the pulping process and is, at the same time, convertible in the combustion step into an active pulping chemical either with or without subsequent causticization.

I claim:

1. The improvement in the process of recovering pulping chemical from the solids content of a waste pulping liquor of a pulping process employing a sodium compound as pulping chemical, which liquor contains a sodium-containing pulping chemical and a considerable proportion of organic matter, which consists in adding to the material under treatment a combustion-promoting inorganic compound which is adapted to yield a substantial proportion of a sodium-containing active pulping chemical and incinerating the mixture.

2. The improved process as defined in claim 1, characterized in that the added inorganic compound is sodium nitrate.

3. The improved process as defined in claim 1, characterized in that the said inorganic sodium compound is added to the material under treatment at a stage subsequent to separation of pulp from waste pulping liquor and prior to complete thermal decomposition of solids residue from said waste pulping liquor.

4. Process of recovering pulping chemical from a waste pulping liquor of an alkaline pulping process employing a sodium compound as pulping chemical which waste pulping liquor contains a considerable proportion of organic matter and a sodium compound as pulping chemical, which comprises incorporating a substantial proportion of sodium nitrate with the solids content of the waste pulping liquor and incinerating the so-augmented solids content.

5. Process of recovering pulping chemical from the waste pulping liquor of an alkaline pulping process employing a sodium compound as pulping chemical and simultaneously supplying make-up chemical to compensate for losses during the pulping and chemical recovering processes, which comprises at least partially concentrating said liquor, adding to the concentrate sodium, in the form of sodium nitrate, in an amount substantially equal to the amount of sodium lost during the process, and incinerating the mixture.

HAROLD R. MURDOCK.